(12) United States Patent
Tomioka

(10) Patent No.: US 11,715,218 B2
(45) Date of Patent: Aug. 1, 2023

(54) INFORMATION PROCESSING APPARATUS AND INFORMATION PROCESSING METHOD

(71) Applicant: CANON KABUSHIKI KAISHA, Tokyo (JP)

(72) Inventor: Makoto Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 17/361,009

(22) Filed: Jun. 28, 2021

(65) Prior Publication Data

US 2021/0407113 A1 Dec. 30, 2021

(30) Foreign Application Priority Data

Jun. 30, 2020 (JP) ................... 2020-113194

(51) Int. Cl.
*G06T 7/33* (2017.01)
*G06T 7/73* (2017.01)
(Continued)

(52) U.S. Cl.
CPC ............... *G06T 7/33* (2017.01); *G06T 5/006* (2013.01); *G06T 7/55* (2017.01); *G06T 7/73* (2017.01); *G06T 7/80* (2017.01)

(58) Field of Classification Search
CPC .. G06T 7/33; G06T 5/006; G06T 7/55; G06T 7/73; G06T 7/80; G06T 2207/10012;
(Continued)

(56) References Cited

U.S. PATENT DOCUMENTS

2020/0027243 A1* 1/2020 Ziegler ............... H04N 13/246

FOREIGN PATENT DOCUMENTS

JP 5471626 B 4/2014
KR 102249381 B1 * 5/2021

OTHER PUBLICATIONS

Z. Zhang, "A Flexible New Technique for Camera Calibration", IEEE Transactions on Pattern Analysis and Machine Intelligence, vol. 22, No. 11. Nov. 2000.

(Continued)

*Primary Examiner* — Chan S Park
*Assistant Examiner* — Daniel C Chang
(74) *Attorney, Agent, or Firm* — Canon U.S.A., Inc. IP Division

(57) ABSTRACT

An information processing obtains a first image which is obtained by using a first camera to capture a three-dimensional space; obtains map information that is generated based on a second transformed image obtained by using second transformation information to geometrically transform a second image which has been captured by using a second camera to capture the three-dimensional space; generates a first transformed image by using first transformation information to geometrically transform the first image; and collates the map information and the first transformed image. The first transformation information and the second transformation information are set so that a geometric correspondence relationship between the three-dimensional space and the first transformed image and a geometric correspondence relationship between the three-dimensional space and the second transformed image will have a common geometric correspondence relationship.

20 Claims, 9 Drawing Sheets

(51) Int. Cl.
    *G06T 7/55*     (2017.01)
    *G06T 5/00*     (2006.01)
    *G06T 7/80*     (2017.01)
(58) Field of Classification Search
    CPC . G06T 2207/20084; G06T 2207/30164; G06T 2207/30244; G06T 5/50
    See application file for complete search history.

(56) References Cited

OTHER PUBLICATIONS

R. Mur-Artal, et al., "ORB-SLAM: a Versatile and Accurate Monocular SLAM System", IEEE Transactions on Robotics, 2015.
C. Hughes, et al., "Equidistant Fish-Eye Calibration and Rectification by Vanishing Point Extraction", IEEE Transactions on Pattern Analysis and Machine Intelligence, 2010.
M. Jaderberg, et al., "Spatial Transformer Networks", Neural Information Processing Systems, 2015.
I. Laina, et al., "Deeper Depth Prediction with Fully Convolutional Residual Networks", 3DV, Sep. 2016.
H. Dhamo, et al., "Object-Driven Multi-Layer Scene Decomposition From a Single Image", ICCV, 2019.

* cited by examiner

INFORMATION PROCESSING APPARATUS AND INFORMATION PROCESSING METHOD

BACKGROUND

Field of the Disclosure

The present disclosure relates to a technique for efficiently sharing map information which is generated based on information obtained by a sensor.

Description of the Related Art

The measurement of the position and the orientation of a camera based on image information is used for various kinds of purposes such as for aligning a virtual object and a real space in mixed reality/augmented reality, for self-position estimation of a robot or an automobile, for three-dimensional modeling of an object or a space, and the like. Position and orientation estimation uses a map that includes features holding the two-dimensional position information detected from the image information and the three-dimensional position information reconstructed from these features.

Japanese Patent No. 5471626 (patent literature 1) discloses a method for updating a global map by calculating the relative positions between the global map which has a plurality of active users and a local map which is generated by a terminal device with a camera held by one of the users. In this method, the relative positions are calculated based on the feature amount of an object, which is commonly included in the global map and the local map, so that the pieces of three-dimensional position information of features commonly included in the global map and the local map will match.

However, the technique disclosed in patent literature 1 is problematic in that in a case in which a camera used for generating a map is different from a camera that is to use the generated map, the accuracy and the stability of position and orientation calculation and the collation between the map and the image captured by the camera will degrade. In addition, a map will need to be generated for each camera to generate a map with stable accuracy, and map generation will be problematically laborsome.

SUMMARY

According to one aspect of the present disclosure, an information processing apparatus comprises: an image obtainment unit configured to obtain a first image which is obtained by using a first camera to capture a three-dimensional space; a map information obtainment unit configured to obtain map information that is generated based on a second transformed image obtained by using second transformation information to geometrically transform a second image which has been captured by using a second camera different from the first camera to capture the three-dimensional space; an image transformation unit configured to generate a first transformed image by using first transformation information to geometrically transform the first image; and a collation unit configured to collate the map information and the first transformed image, wherein the first transformation information and the second transformation information are set so that a geometric correspondence relationship between the three-dimensional space and the first transformed image and a geometric correspondence relationship between the three-dimensional space and the second transformed image will have a common geometric correspondence relationship.

According to another aspect of the present disclosure, an information processing apparatus comprises: an image obtainment unit configured to obtain a first image which is obtained by using a first camera to capture a three-dimensional space; a map information obtainment unit configured to obtain map information that is generated based on a second transformed image obtained by using second transformation information to geometrically transform a second image which has been captured by using a second camera which is different from the first camera to capture the three-dimensional space; and a collation unit configured to collate a feature point of the first image and the map information of transformed coordinates which are obtained by using first transformation information to geometrically transform the coordinates of the feature point of the first image, wherein the first transformation information and the second transformation information are set so that a geometric correspondence relationship between the three-dimensional space and a first transformed image, which is obtained by using the first transform information to transform the first image, and a geometric correspondence relationship between the three-dimensional space and the second transformed image will have a common geometric correspondence relationship.

The present disclosure can efficiently share map information which is generated based on information obtained by a sensor.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
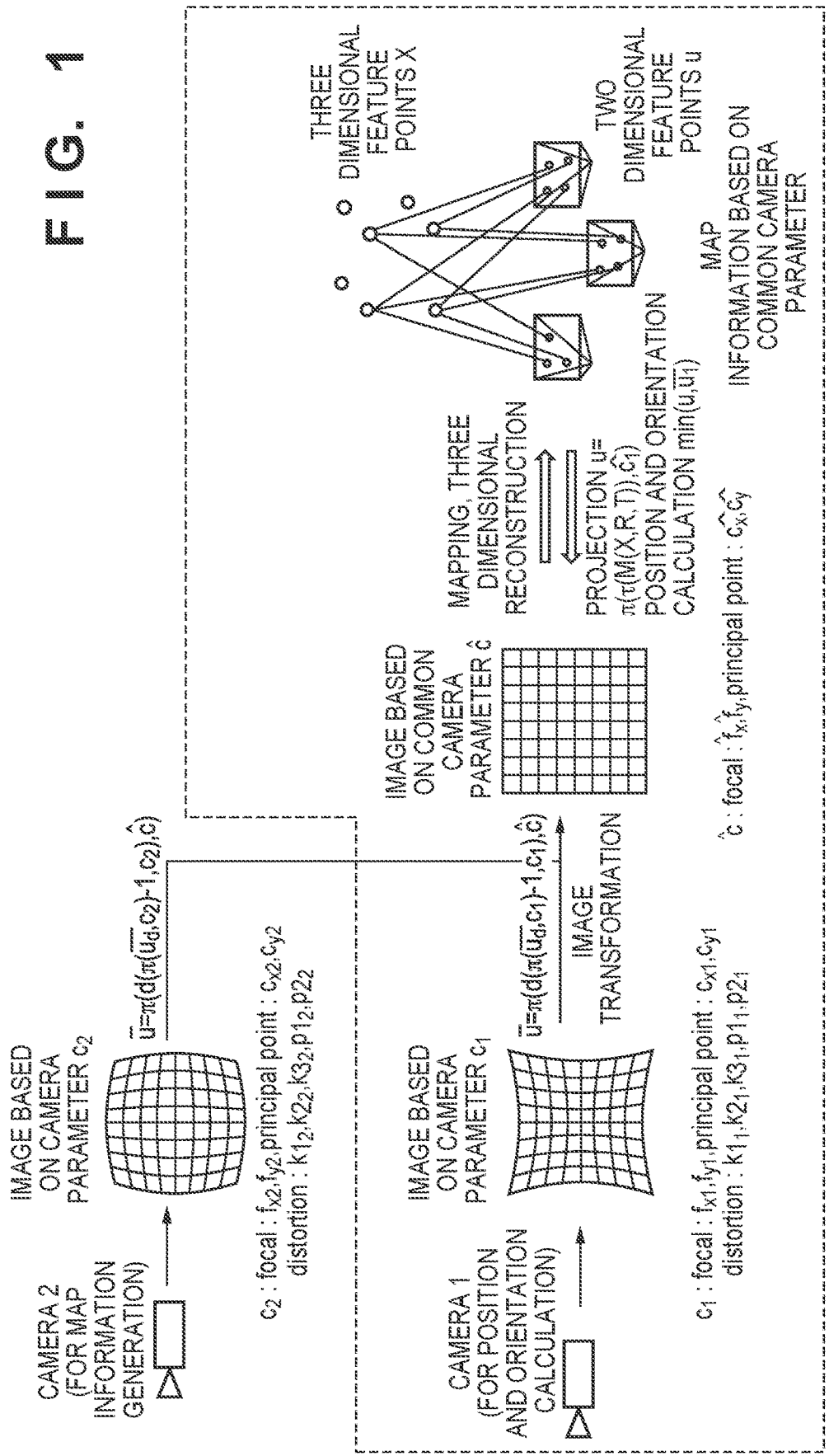
FIG. 1 is a view for explaining the concept of processing in a system.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

An information processing apparatus that matches map information with an image input from a camera and calculates the position and the orientation of another camera will be described as the information processing apparatus according to the first embodiment of the present disclosure. For example, the calculated position and orientation information will be used for controlling a moving body. Note that since the method of controlling a moving body by inputting the position and the orientation is a known method, a description will be omitted.

<Outline of Operation of System>

In the first embodiment, map information generated by using an image captured by a camera 2 will be used to calculate the position and the orientation of a camera 1 which is different from the camera 2. In particular, the labor needed for generating a map for each camera will be reduced, and the position and the orientation will be calculated accurately in a stable manner.

FIG. 1 is a view for explaining the concept of processing in a system. As described above, the map information generated by using an image captured by the camera 2 is used to calculate the position and the orientation of the camera 1. The map information is generated in advance based on a transformed image obtained by geometrically transforming the image captured by the camera 2. In the position and orientation estimation of a camera, a three-dimensional position of a feature point included in the map is projected onto an image based on camera parameters, and a distance between the projected point and a two-dimensional position of a feature point detected from the image is calculated so as to minimize the distance. The relationship between the image and the camera parameters at the time of projection will be referred to here as "an image expressed according to camera parameters". Here, due to differences in characteristics, the camera 1 and the camera 2 will have different camera parameters, which include a focal length and the distortion of an image to be captured.

In general, to accurately determine the position and the orientation of a camera from an image, images represented by different distortion corrected camera parameters will be generated for respective cameras. For example, camera calibration such as that of literature 1 (Z. Zhang, "A flexible new technique for camera calibration", TPAMI, 2000) (to be referred to as Zhang hereinafter) can be performed in advance. However, if projection processing is performed on the three-dimensional position information included in the map information to correct the image by using different distortion corrected camera parameters for the respective cameras, different two-dimensional positions will be projected for the camera 1 and the camera 2. Hence, the accuracy of feature point matching and position and orientation calculation will degrade (map information and projection processing will be described later).

Therefore, in the first embodiment, instead of generating an image which has undergone distortion correction for each camera, an image will be generated (transformed) to have a common parameter, and projection processing will be performed on the map information by using the common camera parameter. As a result, feature point matching and position and orientation calculation can be performed accurately.

Map information is data that holds image feature information detected from an image, position and orientation information (to be referred to as the position and the orientation of the image hereinafter) of a camera that captured the image from which the image feature was detected, and three-dimensional position information of the image feature. The image feature information refers to a feature amount and two-dimensional coordinates (u, v) of an image feature of the image. An image feature is detected as a feature point that indicates a geometric structure such as a corner in an image. The position and orientation information refers to six parameters obtained by combining three parameters which represent the position of a camera and three parameters which represent the orientation (direction) of the camera. Note that the six parameters may be represented in a 3×3 matrix as a rotation matrix. Since a mutual transformation method is well-known as a rotation representation, a description will be omitted. In addition, the three-dimensional position information of an image feature (feature point) refers to three-dimensional coordinates (X, Y, Z) of a world coordinate system.

First, in the position and orientation calculation of the camera 1, a feature point detected from a monochrome image captured by the camera 1 and a feature point included in the map information are matched. Next, the position and the orientation of the camera 1 are calculated by solving a PNP problem (Perspective-n-Point problem) based on a correspondence relationship between the three-dimensional coordinates of the matched feature points and the detected two-dimensional position of the feature points on the image. Solving the PNP problem represents obtaining the position and the orientation of the camera 1 that can minimize an error function as shown by $$\Sigma \text{dist}(u\overline{u_1}) \quad (1)$$

where dist( ) is a function for obtaining the squared distance of a distance between two two-dimensional coordinate points. $u_1^- = (u_1^-, v_1^-)$ is a two-dimensional coordinate point of a feature point of a distortion corrected image of the camera 1. Distortion correction is the removal of geometric distortion which is unique to a lens optical system and is generated in a captured image. More specifically, a lens distortion corrected image is generated from an image captured by the camera 1, and a detected two-dimensional coordinate point $(u_1)^-$ of a feature point detected in the distortion corrected image is calculated. The camera distortion parameters to be used for image distortion are obtained by, for example, calibrating the distortion parameters of a radial-tangential model in advance.

In camera calibration, Zhang's method is used to generate a camera parameter $c_1$ of the camera 1 and a distortion corrected camera parameter $c_1\hat{}$ of the camera 1. The camera parameter $c_1$ includes a focal length $(f_{x1}, f_{y1})$, image center coordinates $(c_{x1}, c_{y1})$, and distortion parameters $k_{11}, k_{21}, k_{31}, p_{11}$, and $p_{21}$. The distortion corrected camera parameter $c_1\hat{}$ includes a focal length $(f_{x1}\hat{}, f_{y1}\hat{})$ and image center coordinates $(c_{x1}\hat{}, c_{y1}\hat{})$, but the distortion parameter is 0. A method in which a pinhole camera model is used as the camera model will be described here.

$u=(u, v)^T$ is a point to which the three-dimensional coordinates of the feature point have been projected. By using a position $T=(t_x, t_y, t_z)^T$, a 3×3 rotation matrix R as the orientation, and the distortion corrected camera parameter $c_1\hat{}$ of the camera 1, the point to which the three-dimensional coordinates of the feature point have been projected can be represented by $$= \pi(\tau(M(XRT))_1) \qquad (2)$$

where M( ) is a function that transforms the three-dimensional coordinates of the world coordinate system into a coordinate point Xc=(Xc, Yc, Zc)$^T$ of a camera coordinate system and defined as $$X_c = M(XRT) \triangleq R(\ ) + T \qquad (3)$$

where $\tau($ $)$ is a projection processing function for projecting the three-dimensional coordinates to a two-dimensional normalized coordinate point x=(x, y)$^T$ and defined as $$x = \tau(X_c) \triangleq \begin{pmatrix} \dfrac{X_c}{Z_c} \\ \dfrac{Y_c}{Z_c} \end{pmatrix} \qquad (4)$$

where $\pi($ $)$ is a function expressing the transformation from normalized coordinates into image coordinates and defined as $$u = \pi(x\ \hat{i}) \triangleq \begin{pmatrix} x\widehat{f_{x_1}} & \widehat{c_{x_1}} \\ y\widehat{f_{y_1}} & \widehat{c_{y_1}} \end{pmatrix} \qquad (5)$$

In addition, the position and the orientation of the camera 1 can be calculated more accurately by further performing map optimization (bundle adjustment) that uses equation (2) to minimize the position and the orientation of the camera at each time and the three-dimensional coordinates of the feature point with respect to an image observed a plurality of times.

As described above, in Zhang's method, the distortion corrected camera parameter differs for each camera because of camera parameter differences due to the specification differences and individual differences of cameras. Hence, even if the same space is captured, the distortion corrected images will differ for the respective cameras. In other words, if the distortion corrected camera parameter $c_1\hat{}$ of the camera 1 is used to perform position and orientation calculation on a map generated by using a distortion corrected camera parameter $c_2\hat{}$ of the camera 2, the accuracy of the position and the orientation will degrade.

Therefore, in the first embodiment, as long as the cameras are arranged in the same position, even if there are specification differences and individual differences between the cameras, an image will be transformed so that an object in the space will appear in the same position in the distortion corrected image of the camera 2 and the transformed image of the camera 1. This will allow the position and the orientation of the camera 1 to be calculated without being affected by individual differences between the cameras.

Here, a common parameter $c\hat{}$ is defined as a camera parameter used to project a three-dimensional space included in the map information to an two-dimensional array, that is, a camera parameter which is projected to the same position in an image when a three-dimensional feature point is projected to an image obtained by a different camera. Here, the common parameter $c\hat{}$ includes a focal length ($f_x\hat{}$, $f_y\hat{}$) and image center coordinates ($c_x\hat{}$, $c_y\hat{}$), and the distortion parameter is 0. An image that is transformed so as to have the same geometric correspondence relationship under a common parameter will be referred to as "a transformed image expressed according to a common parameter" or simply as a transformed image.

In this embodiment, the distortion corrected camera parameter $c_2\hat{}$ of the camera 2 is used as the common parameter (that is, $c\hat{}=c_2\hat{}$). Note that the distortion corrected camera parameter $c_2\hat{}$ includes a focal length ($f_{x2}\hat{}$, $f_{y2}\hat{}$) and image center coordinates ($c_{x2}\hat{}$, $c_{y2}\hat{}$), and the distortion parameter is 0. Subsequently, the image captured by the camera 1 is transformed so that it will be expressed according to the common parameter (that is, the distortion corrected camera parameter of the camera 2).

In this embodiment, assume that the map information is generated in advance by using an input image of the camera 2 and is stored in an external memory 24 (to be described later with reference to FIG. 3). Note that the map information is generated by using a SLAM (Simultaneous Localization and Mapping) technique for generating the position and the orientation and a three-dimensional position of a feature point (that is, map information) of a camera from an image. For example, the map information is generated by using a method disclosed in literature 2 (R. Mur-Artal et al., "ORB-SLAM: a Versatile and Accurate Monocular SLAM System", T-RO, 2015) (to be referred to as Raul hereinafter).

<Apparatus Arrangement>

Figure 2:
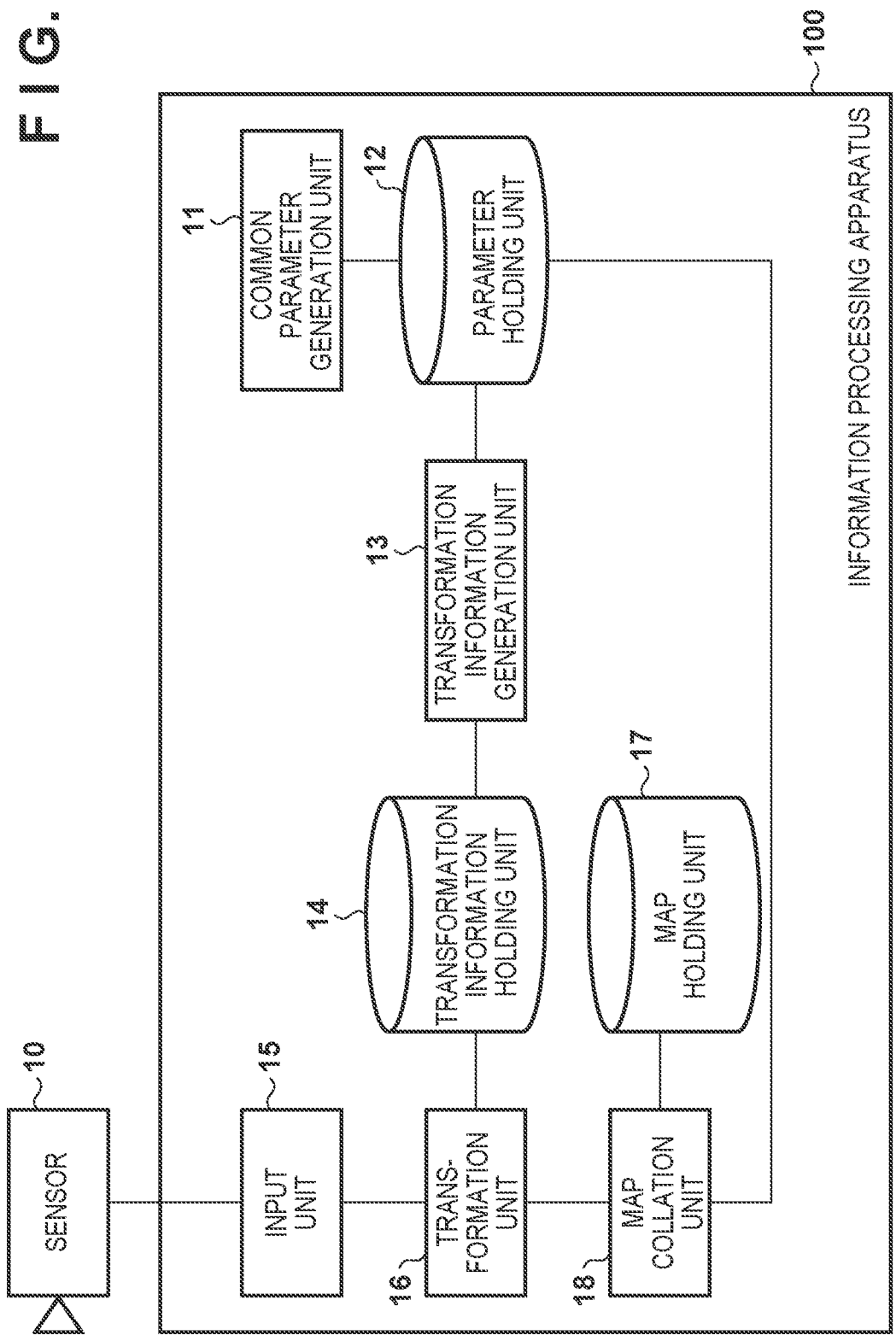
FIG. 2 is a block diagram showing the functional arrangement of an information processing apparatus.

FIG. 2 is a block diagram showing the functional arrangement of an information processing apparatus 100 according to the first embodiment. As described above, the information processing apparatus 100 calculates the position and the orientation of a camera based on an image input from a sensor 10 as the camera, and output the calculated position and orientation information to a moving body control unit (not shown) to control a moving body.

A common parameter generation unit 11 generates a common parameter. Note that it may be arranged so that a common parameter will be input from a parameter input unit (not shown). As described above, a common parameter according to this embodiment is the distortion corrected camera parameter $c_2\hat{}$ of the camera 2 which generated the map information held by a map holding unit 17 and is $c\hat{}=c_2\hat{}$. That is, the map information is generated based on a corrected image obtained by correcting only the distortion of the image captured by the camera 2. However, the map information suffices to be generated based on a corrected image obtained by performing at least one of angle of view adjustment, image center adjustment, and distortion correction on the image captured by the camera 2.

A parameter holding unit 12 holds the common parameter generated by the common parameter generation unit 11 and the camera parameter $c_1$ of the camera 1. The camera parameter is input from the parameter input unit (not shown). The common parameter is output to a transformation information generation unit 13 and a map collation unit 18.

The transformation information generation unit 13 generates a lookup table (to be referred to as a remapping table hereinafter) for transforming an input image input from the camera 1 into a transformed image expressed according to the common parameter. The remapping table is generated by using the common parameter and the camera parameter of the camera 1 input from the parameter holding unit 12. The remapping table has a two-dimensionally arrayed data structure that indicates the correspondence between a pixel of a given image and a pixel of another image. The generated remapping table is output to a transformation information holding unit 14. The transformation information holding unit 14 holds the remapping table generated by the transformation information generation unit 13. The remapping table is output to a transformation unit 16.

An input unit 15 is connected to the camera 1 as the sensor 10, obtains, in time series (for example, at 60 fps), each image captured by the transformation unit 16, and outputs each obtained image to the transformation unit 16. Assume here that the sensor 10 obtains a monochrome image. The transformation unit 16 uses the remapping table input from the transformation information holding unit 14 to geometrically transform (perform image transformation on) the image input by the input unit 15. The transformed image obtained by the geometric transformation is output to the map collation unit 18.

The map holding unit 17 loads, from the external memory 24, the map information generated in advance by using the common parameter, and holds the loaded map information. The held loaded map information is output to the map collation unit 18. The map collation unit 18 obtains map information from the map holding unit 17 and collates the transformed image input from the transformation unit 16 and the map information obtained from the map holding unit 17 to calculate the position and the orientation of the sensor 10. The calculated position and orientation information is output to the moving body control unit (not shown).

Figure 3:
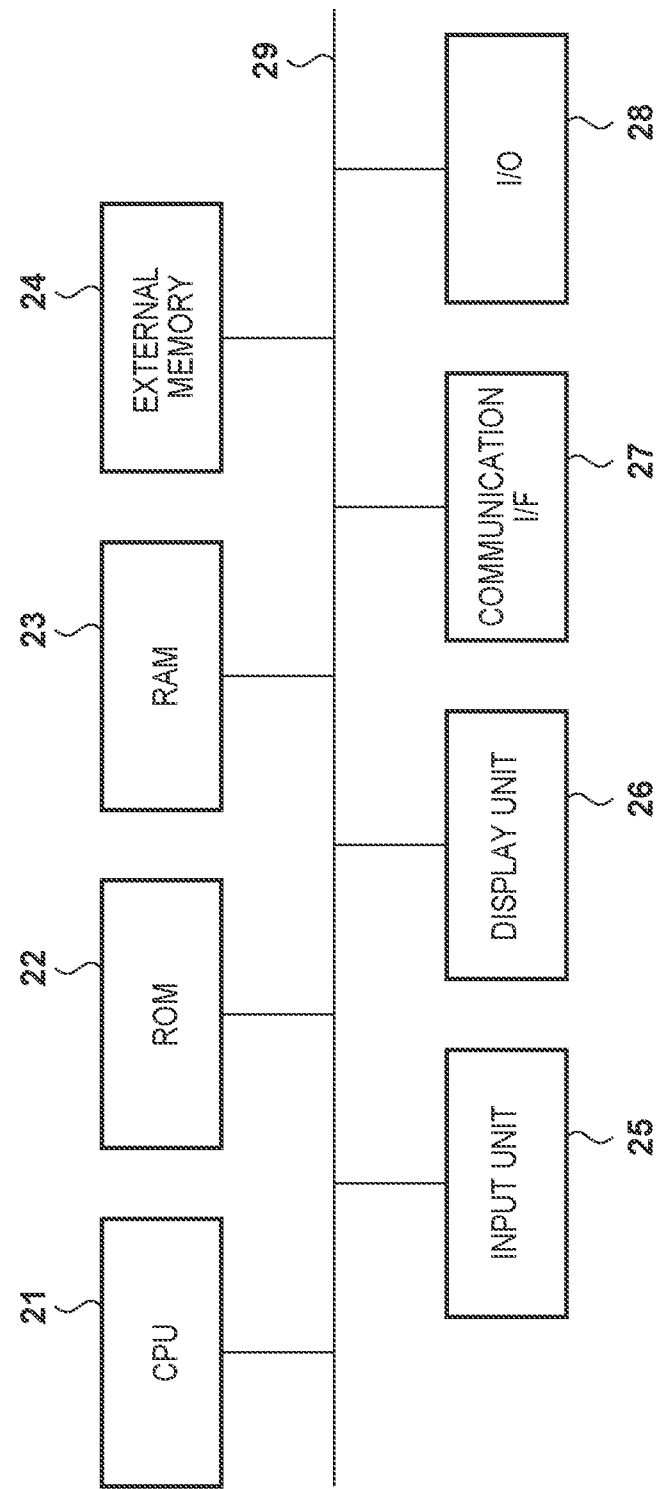
FIG. 3 is a block diagram showing the hardware arrangement of the information processing apparatus.

FIG. 3 is a block diagram showing the hardware arrangement of the information processing apparatus 100. A CPU 21 controls various kinds of devices connected to a system bus 29. A ROM 22 stores BIOS program and a boot program. A RAM 23 is used as the main storage device of the CPU 21. The external memory 24 stores programs to be processed by the information processing apparatus 100.

An input unit 25 performs processing related to input of information and the like from a keyboard, a mouse, and the like. A display unit 26 outputs, on a display device, a computation result in accordance with an instruction from the CPU 21. Note that the display device may be any kind of a device such as a liquid crystal display device, a projector, an LED indicator, or the like. A communication interface 27 performs information communication via a network.

The interface standard may be a network communication standard such as Ethernet or the like. The communication may be any kind of communication such as serial communication by USB, wireless communication, or the like. Note that the position and orientation information calculated by the information processing apparatus 100 is output to the moving body control unit (not shown) via the communication interface 27. An I/O 28 receives an image from the sensor 10.

<Operation of Apparatus>

Figure 4:
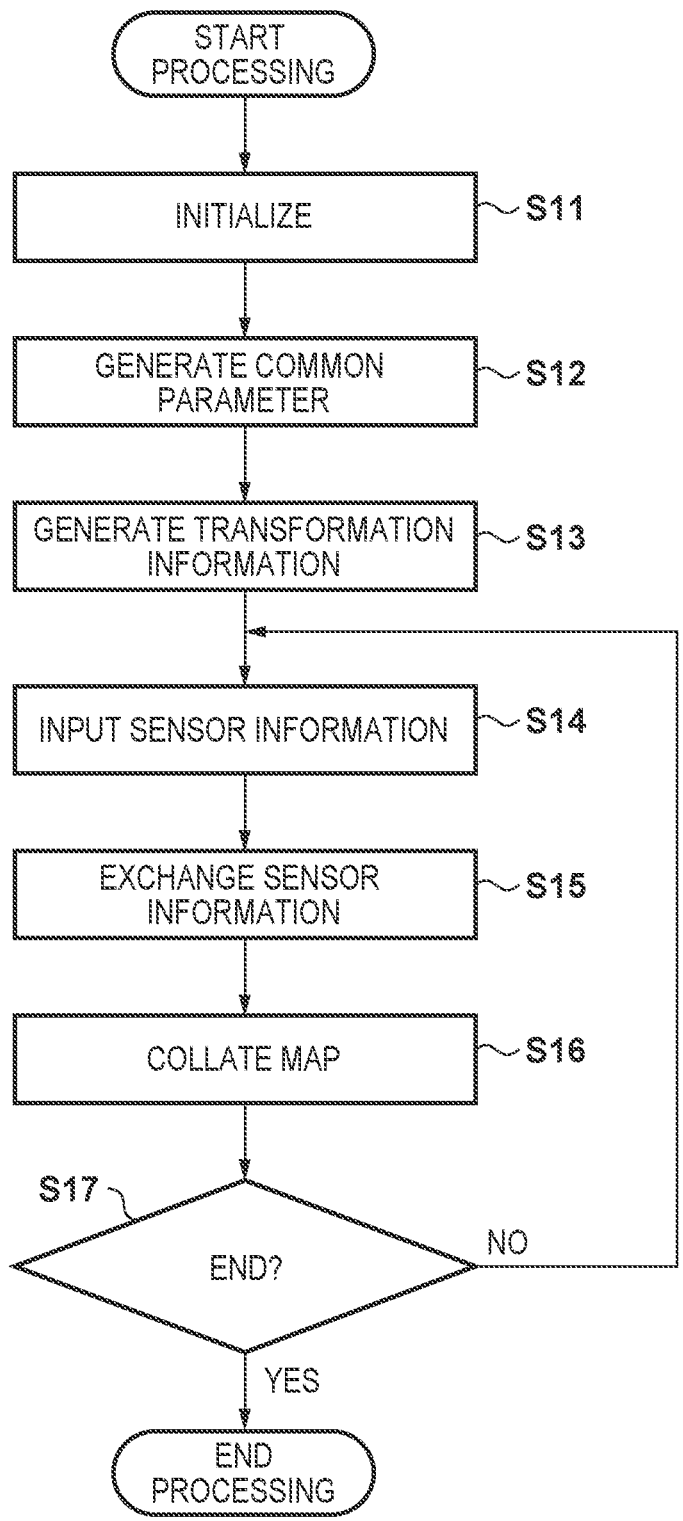
FIG. 4 is a flowchart for explaining an operation of the information processing apparatus.

FIG. 4 is a flowchart for explaining the operation of the information processing apparatus 100.

In step S11, the information processing apparatus 100 initializes the system. That is, the information processing apparatus 100 is set in an operable state by loading a program from the external memory 24. In addition, the map information and the camera parameter are loaded from the external memory 24 to the RAM 23 as needed.

In step S12, the common parameter generation unit 11 obtains the camera parameter of the camera 1 and the common parameter via the parameter input unit (not shown). Subsequently, the common parameter generation unit 11 outputs the obtained common parameter to the parameter holding unit 12.

In step S13, the transformation information generation unit 13 generates transformation information (that is, a remapping table) for generating, from the input image of the camera 1, a transformed image expressed according to the common parameter. More specifically, a remapping table is generated by using the common parameter and the camera parameter $c_1$ of the camera 1 held by the parameter holding unit 12.

An image coordinate point $u_d^- = (u_d^-, v_d^-)^T$ of the input image of the camera 1 and a transformed image $u^- = (u^-, v^-)^T$ can be represented by $$\bar{u} = \pi((\pi(\overline{u_d}c_1)^{-1}c_1)\hat{c}) \tag{6}$$

where $\pi(\ )^{-1}$ is a function that transforms image coordinates into normalized coordinates and represented by $$\pi(\overline{u_d}c_1)^{-1} = \begin{pmatrix} \dfrac{\overline{u_d} - \hat{c}_{x_1}}{f_{x_1}} \\ \dfrac{\overline{v_d} - \hat{c}_y}{f_{y_1}} \end{pmatrix} \tag{7}$$

where d( ) is a lens distortion model and a function expressing the relationship between a normalized coordinate point x'=(x', y') with distortion (input image) and a normalized coordinate point x=(x, y) and represented by $$\hat{x} = (xc_1) \triangleq \begin{pmatrix} x(+1_1(x^2+y^2) + k_{2_1}(x^2+y^2)^2 + k_{3_1}(x^2+y^2)^3) + p_{1_1}xy + p_{2_1}(x^2+y^2) \\ (+1_1(x^2+y^2) + k_{2_1}(x^2+y^2)^2 + k_{3_1}(x^2+y^2)^3) + p_{1_1}(x^2+y^2) + p_{2_1}xy \end{pmatrix} \tag{8}$$

where $\pi(\ )$ is a function that transforms the normalized coordinates into image coordinates of a transformed image expressed by the common parameter, and is represented by $$\bar{u} = \pi(x\hat{c}) \triangleq \begin{pmatrix} x\hat{f}_{x_1} + \hat{c}_x \\ y\hat{f}_y + \hat{c}_y \end{pmatrix} \tag{9}$$

Equation (6) represents the image coordinates of the input image with respect to a coordinate point $u^-$ of each transformed pixel. The remapping table is generated here as a two-dimensional array storing the pre-distortion correction coordinates of each transformed pixel. The generated remapping table is held by the transformation information holding unit 14.

In step S14, the input unit 15 inputs an image captured by the camera 1 as the sensor 10. The input image is output to the transformation unit 16.

In step S15, the transformation unit 16 uses the remapping table to transform the input image into a transformed image expressed according to the common parameter. More specifically, a transformed image is generated by determining a pixel value by bilinear interpolation based on coordinates designated by each element of the remapping table, and storing the pixel value in each pixel of the transformed image. Note that in the remapping table, if a given pixel indicates a coordinate point outside the image, the pixel will be set as a black pixel (a luminance of 0). Subsequently, the transformed image is output to the map collation unit 18.

In step S16, the map collation unit 18 calculates the position and the orientation of the sensor 10 by using the map held by the map holding unit 17 and the transformed image expressed according to the common parameter input by the transformation unit 16. For example, Raul's method is used to calculate the position and the orientation by using the map. However, the transformed image will be input instead of the input image of the camera 1 and the common parameter will be used as the camera parameter to be used in the position and orientation calculation.

In step S17, the information processing apparatus 100 determines whether to end the system. For example, in a case in which the moving body (not shown) has arrived at a destination, a command for ending the system will be input from the moving body control unit (not shown). The system will be ended if the end command has been input. Otherwise, the process will return to step S14, and sensor information transformation and map collation will be continued.

<Effect>

As described above, according to the first embodiment, map collation is performed after transforming, in advance, the image of the camera 1 into a transformed image expressed according to a common parameter. At this time, the distortion corrected camera parameter of the camera 2 used to generate the map is used as the common parameter. By executing processing in this manner, collation of the map and the image and the position and orientation calculation can be performed stably and accurately even in a case in which the camera used to generate the map is different from the camera used in the position and orientation calculation. In addition, the labor needed for generating a map for each camera will be eliminated.

Furthermore, the transformation of the image of the camera 1 into an image expressed according to the common parameter can be implemented by just changing the remapping table used in the image correction processing (remapping) of a conventional distortion correction operation. Therefore, image transformation can be implemented without increasing the processing time of the map collation processing.

<Modification>

In the above description, the sensor 10 (camera 1) is a monochrome camera which obtains a monochrome image. However, the sensor 10 is not limited to a monochrome camera, and a color camera, a stereo camera, a depth camera, or the like can be used. That is, any camera can be used as long as it is a camera that can obtain the two-dimensional array information obtained as a result of projecting a three-dimensional space. Note that a depth camera is a camera that obtains a depth map in which each pixel of the camera stores a depth value from the sensor. In addition, the sensor 10 may be a three-dimensional LiDAR configured to project a three-dimensional space to a two-dimensional array and store the result of the projection. The sensor may be arranged to include a single lens camera, a stereo camera, or a plurality of cameras.

In addition, in the above description, the map information is data that holds the image feature information detected from an image, the position and orientation information of the camera 2 which captured the image from which the image feature was detected, and the three-dimensional position information of the image feature. However, the data structure of the map information is not limited to this, and suffices to have an arrangement that holds a feature which has coordinates representing a three-dimensional spatial position and a feature which represents a two-dimensional spatial position obtained by projecting the feature of the three-dimensional spatial position to a two-dimensional space. A feature which represents the three-dimensional spatial position need not only be a feature that holds a single three-dimensional coordinate point such as a feature point, but may also be an NP (Normal Point Data) that includes a normal. A feature may also be an SDF (Signed Distance Function) or an TSDF (Truncated Signed Function) that represents a boundary position of an object in a space. A feature may also be a three-dimensional line segment. In addition, a feature representing a two-dimensional spatial position is not limited to the feature point described in this embodiment, and may be an edge or distribution information of bright regions and dark regions.

Furthermore, although a pinhole camera model is used as a camera model in the above description, another model may also be used. It is sufficient as long as a model that projects a predetermined plane such as a plane, a sphere, or a hyperfunction plane is used. For example, an omnidirectional camera model, a double sphere camera model, or an extended unified camera model can be used. Furthermore, an equirectangular camera model may be used. Note that the common parameter will change into a format corresponding to the camera model when the camera model is changed.

The radial-tangential model is used as the distortion model in the above description. However, the present disclosure is not limited to this, and any model can be used as long as it is a model that can obtain the correspondence relationship between the pixels of an image before distortion correction and the pixels of an image after distortion correction. An equidistant model or an FOV model may be used. In addition, although Zhang's method has been described as a method for obtaining the correspondence between the pixels before the distortion correction and the pixels after the distortion correction, the method is not limited to this as long as it is a method capable of obtaining a correspondence relationship. For example, in the case of an equidistant model, a method disclosed in literature 3 (C. Hughes et al., "Equidistant Fish-Eye Calibration and Rectification by Vanishing Point Extraction", TPAMI, 2010) may be used.

Furthermore, in the above description, the transformation unit 16 determines a pixel value by using a remapping table and bilinear interpolation. However, as long as a method that can determine each pixel value of a transformed image expressed according to the common parameter is used, an arbitrary interpolation processing operation such as the nearest neighbor method, trilinear interpolation, or the like may be used. Also, although a pixel designated by the remapping table is set to black (a luminance of 0) when the pixel falls outside the image range, it may be set to another specific value or to the luminance value of a nearest pixel within the image range.

In addition, in the above description, the corrected camera parameter of the camera 2 is used as the common parameter. However, the present disclosure is not limited to this, and the common parameter suffices to be a parameter in common (same) between different cameras. For example, an average or a weighted average of the corrected camera parameter of the camera 1 and the corrected camera parameter of the camera 2 may be used as the common parameter. Note that the common parameter need not be, strictly speaking, a parameter that completely matches each camera. For example, it can be a transformation parameter that can improve the accuracy and the stability of map collation performed by using map information generated by different cameras more than in a case in which the common parameter is not used. For example, differences in predetermined digits below a decimal point can be tolerated.

Furthermore, an arrangement in which the common parameter generation unit 11 has been removed may be used as long as a method that can input a common parameter to the system is used. In such a case, for example, the common parameter can be stored in advance in the parameter holding unit 12 and the parameter holding unit 12 can obtain the common parameter.

It may also be arranged so that transformation information (remapping table) will be generated in advance and the parameter input unit (not shown) will be used to input the transformation information to the transformation information holding unit 14. In such a case, it will be possible to use an arrangement without the common parameter generation unit 11, the parameter holding unit 12, and the transformation information generation unit 13.

In addition, it may be arranged so that the map information held in the map holding unit 17 will be updated. In the updating of the map information, the SLAM (Simultaneous Localization and Mapping) technique can be used to update and add the map information. At this time, as described in step S16, by using the above-described transformed image and using the common parameter as the camera parameter to be used for position and orientation calculation and three-dimensional reconstruction (map generation), the updated map information will become the map information expressed according to the common parameter. Hence, a camera other than the camera 1 will be able to suitably use the generated map information.

In addition, although a method that uses a remapping table as the transformation information has been described above, the method is not limited to this as long as a method that can transform an image obtained by a camera into a transformed image expressed according to the common parameter is used. For example, a CNN (Convolutional Neural Network) that has been trained in advance so that the image captured by the camera will be expressed according to the common parameter may be used. For example, such a CNN can be generated by using a method disclosed in literature 4 (M. Jaderberg et al., "Spatial Transformer Networks", NIPS, 2015).

In addition, a method that uses the position and the orientation, which is calculated by the map collation unit 18, to control a moving body has been described above. However, the calculated position and orientation information can be applied to another apparatus that uses the position and orientation information. For example, the position and orientation information can be used in a position and orientation estimation device that composites and presents a virtual object, such as an MR or an AR, with a real image. Alternatively, the position and orientation information can be used in a device that inputs, based on the position and the orientation of a real space, the current position and the current orientation of a VR which moves in a virtual space. If the position and orientation information is used in a device that measures the distal-end position of a robot hand, it will be possible to calculate the distal-end position of the robot hand without regenerating the map if the camera are exchanged.

In addition, an arrangement in which the map collation unit 18 calculates the position and the orientation of the camera based on the map information has been described. A map collation operation is not limited to position and orientation calculation and suffices to be arranged to match a map with an input image. That is, map collation may be implemented by calculating, for example, the degree of similarity between an image in a map and an input image or be implemented by detecting a change in the environment or by detecting a change in the arrangement of an object due to a difference between the background of a map and the background of an input image. Alternatively, map collation may be implemented so that it will be used for detecting and identifying an object (for example, a person or an object) captured in an image.

Furthermore, although it has been described above that Raul's method will be used in map collation (position and orientation estimation) and map generation, the present disclosure is not limited to this. Any method can be used as long as it is a method that performs position and orientation estimation by associating a three-dimensional feature included in the map information with a two-dimensional feature included in an image.

In addition, the arrangement according to the first embodiment can also be used for absorbing differences in attachment positions in a case in which external parameters (that is, the attachment positions) of the cameras are different. For example, the transformation unit can transform an image to generate an image of a camera with a different attachment position. More specifically, a depth value can be estimated from an RGB image, and an image can be generated by projecting the three-dimensional point of each pixel of an image to an offset position of the camera attachment position that has been calculated in advance. By executing processing in this manner, it will be possible to improve accuracy in a case in which, for example, a map generated based on an image obtained by a camera attached to a given moving body is to be used in a camera attached to another moving body with a different ride height. Note that to estimate a depth value from an RGB image, for example, a CNN generated (trained) by a method disclosed in literature 5 (I. Laina et al., "Deeper Depth Prediction with Fully Convolutional Residual Networks", 3DV, 2016) can be used. The method of generating an image that absorbs the differences in attachment positions is not limited to the above-described method. An image can also be generated by using an arbitrary viewpoint image generation technique. A CNN that has been trained to generate an image of another viewpoint from an input image may be used. For example, a method disclosed in literature 6 (H. Dhamo et al., "Object-Driven Multi-Layer Scene Decomposition From a Single Image", ICCV, 2019) (to be referred to as Dhamo hereinafter) can be applied.

Second Embodiment

The second embodiment will describe a mode in which a common parameter is generated to be setting parameters (for example, an angle of view and an image size) designated by a user. Note that since the arrangement of an apparatus according to the second embodiment is similar to that of the first embodiment (FIG. 2 and FIG. 3), a description will be omitted. In addition, the operation of the apparatus is similar to that of the first embodiment (FIG. 4). However, the detailed operation of step S12 is different.

That is, after a common parameter has been generated, map information is generated by using the common parameter. More specifically, in Raul's method, a transformed image which expresses an image captured by a camera 2 in accordance with the common parameter will be input instead of inputting the image captured by the camera 2. In addition, the common parameter will be used as the camera parameter which is used for position and orientation calculation, feature point projection, three-dimensional reconstruction, and map optimization.

<Graphical User Interface (GUI) for User Input>

As described above, in the second embodiment, the designation of setting parameters by a user will be accepted, and the common parameter will be generated in correspondence with the setting parameters. The designation of the setting parameters is accepted, for example, via a GUI displayed on a display unit 26.

Figure 5:
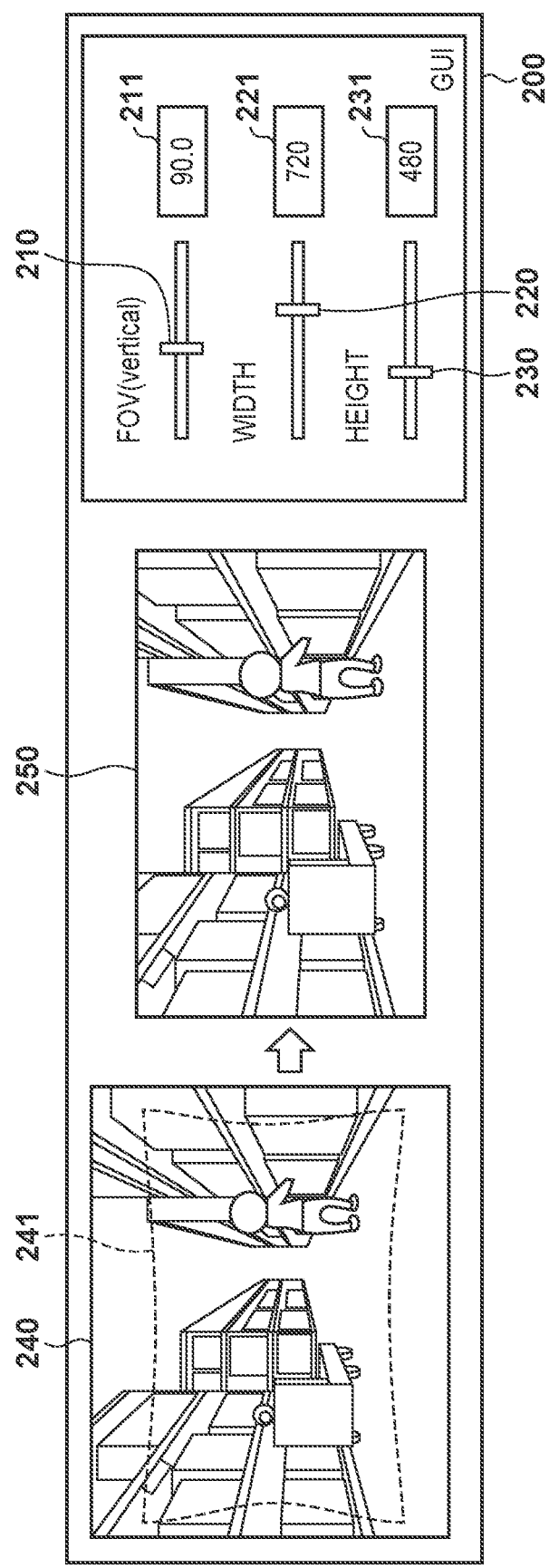
FIG. 5 is a view showing an example of a GUI for generating a common parameter.

FIG. 5 is a view showing an example of a GUI 200 for generating a common parameter. Assume here that an input unit 25 and the display unit 26 are formed as a touch panel display. An angle of view and an image size of a transformed image to be expressed according to the common parameter are input to and accepted by the GUI 200.

A GUI component 210 is a slider for designating an angle of view (FOV), in a vertical direction, of a transformed image expressed according to the common parameter. The angle of view can be set by moving the slider laterally by a finger. A display portion 211 is a display window that presents the value of the angle of view that has been set. A GUI component 220 is a slider that designates a horizontal size of the transformed image to be expressed according to the common parameter. The horizontal size can be set by moving the slider laterally by a finger. A display portion 221 is a display window that presents the horizontal size that has been set. A GUI component 230 is a slider that designates a vertical size of the transformed image to be expressed according to the common parameter. The vertical size can be set by moving the slider laterally by a finger. A display portion 231 is a display window that presents the vertical size that has been set.

A displayed image 240 is a pre-transformation image captured by a camera 1. A display component 241 is a frame that indicates an image range to be cut out when the image is transformed by using the setting parameters input by the user. A displayed image 250 is an image transformed by a transformation unit 16 based on the setting parameters input by the user. The display component 241 and the displayed image 250 are updated each time the user inputs a setting parameter.

As described above, the user inputs a size (w, h) and a vertical angle of view (FOV) of a transformed image to be expressed according to the common parameter. When inputting the common parameter, the user will set the parameters in accordance with the following procedure while viewing the displayed image 240 and the display component 241.

First, the image size to be used for position and orientation calculation is set to an appropriate size such as a VGA size or the like. Next, an FOV value will be decreased in a case in which a region captured in the input image is to be used at a maximum size (that is, the omission of an input image is to be reduced). The FOV value will be increased in a case in which an image which has a wider range than the input image is to be used (image omission will be permitted and more pixels will be used than in the input image). The user will confirm the display component 241 and the displayed image 250 that have been updated in accordance with the input FOV value, and will determine an appropriate FOV value. Furthermore, each image size value will be adjusted (for example, a w value will be increased to increase the angle of view in a horizontal direction) in a case in which each of horizontal and vertical regions included in the transformed image is to be adjusted.

<Generation of Common Parameter>

As described above, in the second embodiment, the detailed operation of common parameter generation performed in step S12 differs from that in the first embodiment. After the common parameter has been generated in step S12 and the process of step S13 has been performed, a map expressed by the generated common parameter will be loaded. Subsequently, map collation (that is, position and orientation calculation of the camera 1) will be performed onward from step S14.

In step S12, a common parameter generation unit 11 accepts the setting parameters input by the user. After the user has completed inputting predetermined numerical values via the GUI 200, the common parameter is generated. That is, a common parameter ĉ (a focal length ($\hat{f}_x$, $\hat{f}_y$) and image center coordinates ($\hat{c}_x$, $\hat{c}_y$)) is generated from the input setting parameters. More specifically, the common parameter ĉ is calculated by $$\hat{f}_x = \frac{h}{2\tan\left(\frac{1}{2}FOV\right)} \quad (10)$$

$$\hat{f}_y = \hat{f}_x \quad (11)$$

$$\hat{c}_x = \frac{1}{2}w \quad (12)$$

$$\hat{c}_y = \frac{1}{2}h \quad (13)$$

By using the common parameter that has been generated in this manner, the transformation unit 16 can transform the input image, and a map collation unit 18 can calculate the position and the orientation of a sensor 10.

<Effect>

As described above, according to the second embodiment, the user can set the common parameter by viewing the transformed image. For example, the user will be able to set a common parameter that will allow a region captured in the input image of the camera 1 to be used at a maximum size or a common parameter that can process a wide angle range. This will allow the user to set a common parameter corresponding to the purpose.

<Modification>

In the above description, the common parameter is generated based on the image size (w, h) and the vertical angle of view (FOV) input by the user. However, the setting parameters to be input by the user are not limited to the aforementioned parameters. That is, any setting parameter can be used as long as it is a setting parameter that allows a common parameter to be uniquely generated. For example, it may be arranged so that a horizontal angle of view will input instead of a vertical angle of view. In addition, it may be arranged so that the parameters (that is, the focal length and the image center coordinates) included in the common parameter ĉ will be input directly. Furthermore, an interactive input method such as accepting a user operation for modifying the displayed image 240 or the display component 241 in the GUI 200 may also be used.

It may be also arranged to allow the camera model to be selected. More specifically, a camera model may be displayed, and the user may be asked to input setting parameters corresponding to the model after the user has selected the model. For example, it may be arranged to accept input of a Mirror type parameter c if the camera model is an omnidirectional camera model.

In addition, in the above description, a captured image is displayed in the displayed image 240 and the displayed image 250 of the GUI 200. However, it sufficient as long the angle of view that has been transformed in accordance with the common parameter is displayed. For example, it may be arranged so that a display range will be indicated by using an image with grid lines. In addition, it may be arranged so that, instead of displaying only the image of the camera 1, an image will be presented for each camera to use the map information/to be used to generate the map information. Furthermore, it may be arranged so that only the parameters will be input to the GUI 200 without arranging the displayed image 240, the display component 241, and the displayed image 250 (that is, without presenting images).

In addition, although a touch panel display is used as the input unit 25 and the display unit 26 in the above description, it is sufficient as long as setting parameters (or the common parameter itself) can be input. For example, a mouse and a keyboard may be used as the input unit 25, and a display device such as a liquid crystal display or a 7-segment LED may be used as the display unit 26. Alternatively, it may be arranged to accept the selection of parameters by presenting a plurality of parameter candidates on a screen.

In addition, an arrangement that generates (updates) the map information expressed according to the common parameter may be included. In such a case, the map collation unit 18 will generate (update) the map by using, for example, SLAM. Subsequently, in step S16, the map collation unit 18 will generate the position and orientation information and the map information based on Raul's method by using the transformed image expressed according to the common parameter. After the process of step S17, the generated map information will be stored in an external memory 24.

Third Embodiment

The third embodiment will describe a mode in which a common parameter is automatically generated from a plurality of camera parameters. Note that the following description assumes a case in which a common parameter that can allow the maximum amount of pixel information captured by a camera to be used. That is, a region which falls outside an image region will be minimized when an image is to be transformed into a transformed image expressed according to a common parameter. Note that since the arrangement of an apparatus according to the third embodiment is similar to that of the first embodiment (FIG. 2 and FIG. 3), a description will be omitted. In addition, the operation of the apparatus is similar to that of the first embodiment (FIG. 4). However, the detailed operation of step S12 is different.

<Automatic Generation of Common Parameter>

Figure 6:
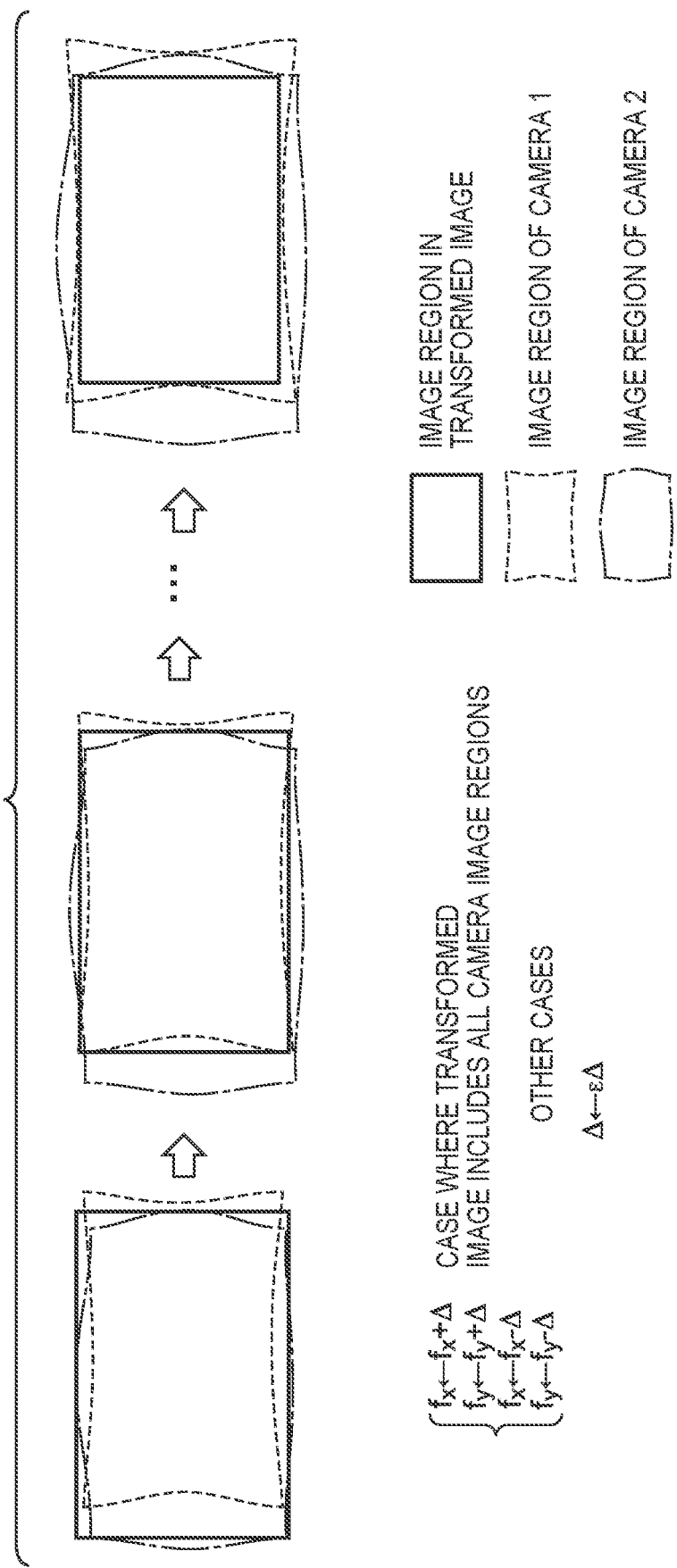
FIG. 6 is a view showing the concept of automatic generation of the common parameter.

FIG. 6 is a view showing the concept of automatic generation of a common parameter. A transformed image, an image region of a camera 1, and an image region of a camera 2 are shown in FIG. 6, and it is shown that the common parameter is adjusted as the process proceeds from left to right in this drawing.

More specifically, in the initial state (the leftmost image), a region outside an image region (dotted lines) as the image capturing range of the camera 1 and a region outside an image region (alternate long and short dash lines) as the image capturing range of the camera 2 are included in an image region (solid line) of the transformed image. On the other hand, in the final state (the rightmost image), the region outside the image region (dotted line) of the camera 1 and the region outside the image region (alternate long and short dash line) of the camera 2 are not included in the image region (solid line) of the transformed image.

As described above, in the third embodiment, the detailed operation of common parameter generation in the process of step S12 differs from that of the first embodiment. In step S12, a common parameter generation unit 11 obtains a common parameter by executing repetitive calculations based on the camera parameters of the camera 1 and the camera 2. More specifically, the common parameter generation unit 11 obtains a common parameter that can minimize each region, among the image capturing regions of the camera 1 and the camera 2, which falls outside the region of the transformed image expressed according to the common parameter (that is, a common parameter that can maximize an image region common between the camera 1 and the camera 2). The common parameter generation operation (step S12) will be described in detail below with reference to FIGS. 6 and 7.

Figure 7:
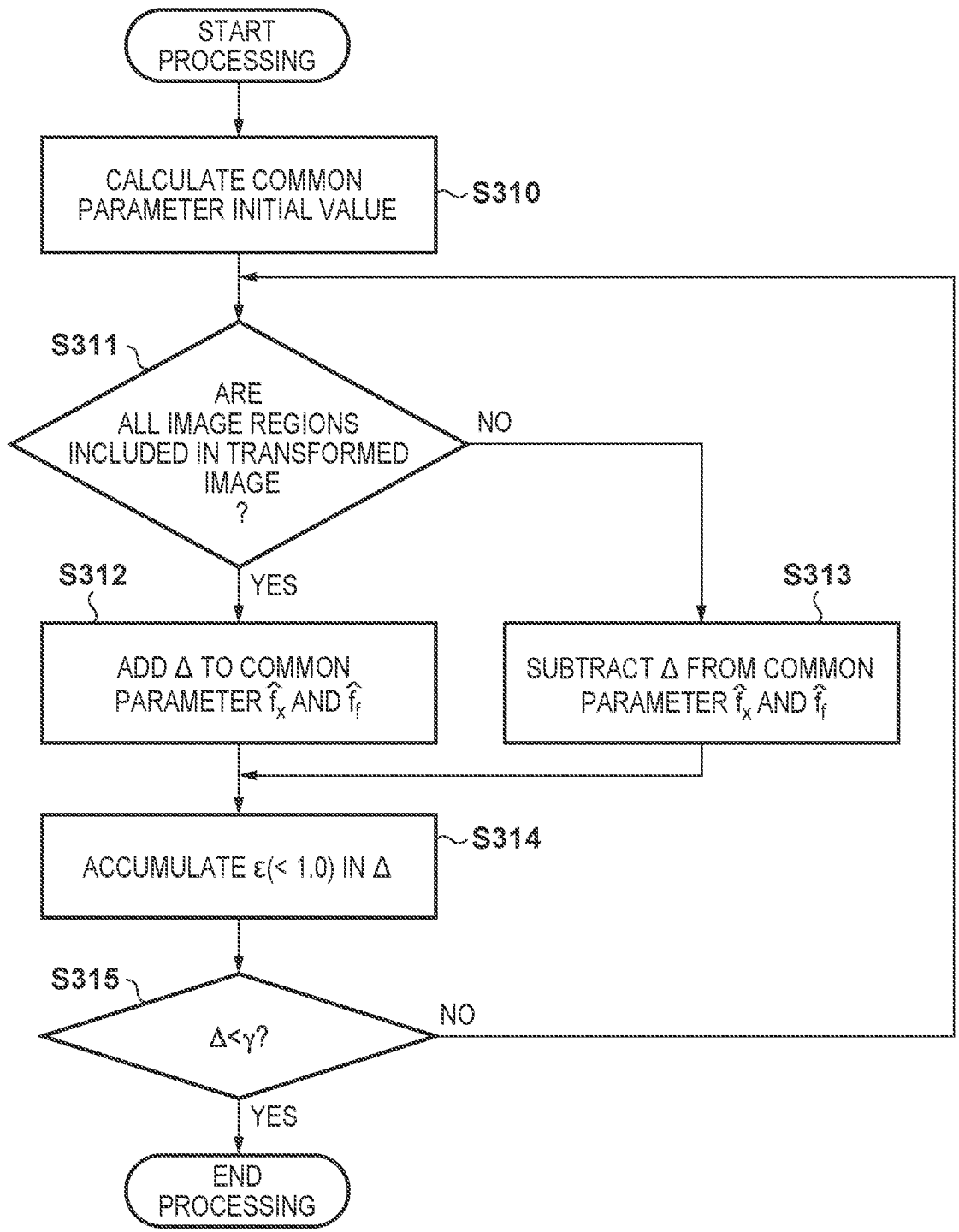
FIG. 7 is a flowchart for explaining an operation of an information processing apparatus (third embodiment)

FIG. 7 is a flowchart for explaining the operation of an information processing apparatus according to the third embodiment. As described above, FIG. 7 illustrates the details of the common parameter generation operation (step S12).

In step S310, the common parameter generation unit 11 sets the initial value of the common parameter. For example, a distortion corrected camera parameter of the camera 2 is calculated from the camera parameter of the camera 2 based on Zhang's method and set as the initial value.

In step S311, the common parameter generation unit 11 determines whether all of the image regions (of both the camera 1 and the camera 2) are included in the transformed image. More specifically, a remapping table is generated based on the method described in step S13, and whether all of the coordinate points indicated by the remapping table are included within the image is determined. If all of the coordinate points are included in the image, the process advances to step S312. Otherwise, the process advances to step S313.

In step S312, the common parameter generation unit 11 increases a focal length $(f_x\hat{}, f_y\hat{})$ by a predetermined value A. On the other hand, in step S313, the common parameter generation unit 11 increases the focal length $(f_x\hat{}, f_y\hat{})$ by the predetermined value A. That is, in steps S312 and S313, the focal length expressed according to the common parameter is adjusted. Subsequently, in step S314, the common parameter generation unit 11 adds the predetermined value A to a predetermined value c (<1.0).

In step S315, the common parameter generation unit 11 determines whether the added predetermined value A is smaller than a predetermined threshold y. If the added predetermined value A is smaller, the processing ends. Otherwise, the process returns to step S311, and the processing is repeated.

<Effect>

As described above, according to the third embodiment, a common parameter that can set an angle of view that allows a maximum amount of pixels of each camera to be used can be generated. As a result, it will be possible to stably and accurately calculate the position and the orientation of a camera even in a case in which a map generated by another camera is used.

<Modification>

In the above description, the focal length of the common parameter is adjusted. However, the parameter to be adjusted is not limited to the focal length of the common parameter as long as a method that improves the map collation performance is used. For example, image center coordinates ($c_{x2}\hat{}$, $c_{y2}\hat{}$) may be adjusted. In addition, the image size of the transformed image may also be adjusted. Alternatively, in a case in which different camera models are used, the parameters of each camera model may be adjusted.

In addition, although the focal length of the common parameter is calculated so as to set a maximum angle of view that allows a maximum amount of pixels of each camera to be used in the above description, another method may be used. For example, the common parameter may be calculated to reduce pixels which will not be referred, among pixels of the input image during remapping, so that all of the pixels of the respective cameras will be included in the transformed image. Alternatively, it may be arranged so that the average or the median of an angle of view occupied by a single pixel in a transformed image will match the average or the median of an angle of occupied by each pixel of each camera. The common parameter may also be calculated so as to increase the image quality of the transformed image. That is, a common parameter that increases an image quality evaluation value, such as PSNR, MSE, SSIM, or the like, of a transformed image which has been obtained by using several common parameter candidates may be selected.

Furthermore, it may be arranged so that the actual map collation performances of a plurality of generated common parameters will be compared and the parameter with the highest performance will be selected. A map collation accuracy is, for example, the accuracy of position and orientation calculation, and can use the number of detected feature points or the number of matched feature points.

Fourth Embodiment

The fourth embodiment will describe a mode in which a transformed image will not be generated based on a common parameter. That is, although a transformed image is generated from an input image of a camera according to the first to third embodiments, pixels of an input image corresponding to the transformed image will be referred during an image reference operation when map collation is to be performed in the fourth embodiment.

<Apparatus Arrangement>

The arrangement of an apparatus according to the fourth embodiment is an arrangement obtained by removing a transformation unit 16 from the arrangement according to the first embodiment (FIG. 2). In addition, the fourth embodiment differs from the first embodiment in the point that an input unit 15 will input an image to a map collation unit 18 and in the point that a transformation information holding unit 14 will input the transformation information to the map collation unit 18.

<Operation of Apparatus>

The operation of the apparatus according to the fourth embodiment is an operation obtained by removing the process of step S15 from the operation according to the first embodiment (FIG. 4). In addition, the operation differs in the point that the input unit 15 will input an image to the map collation unit 18 in step S14, and in the point that the map collation unit 18 will collate the input image with a map held in a map holding unit 17 in step S16.

More specifically, in step S16, the map collation unit 18 will detect a feature point from an input image. Next, by using a remapping table as the transformation information, the two-dimensional coordinates of the detected feature point are transformed into transformed coordinates which are expressed according to a common parameter. At this time, since the remapping table represents the correspondence of discrete pixels in a two-dimensional array, the detected feature point coordinates will interpolate intermediate coordinates by bilinear interpolation. Subsequently, the transformed feature point coordinates and the map held by the map holding unit 17 are collated to calculate the position and the orientation of a sensor 10.

<Effect>

As described above, according to the fourth embodiment, instead of transforming an image, the two-dimensional coordinates of a feature point detected from the image are transformed into two-dimensional coordinates detected in a transformed image expressed according to a common parameter. Such an arrangement can reduce the memory used to hold a transformed image while allowing the position and the orientation of a camera to be calculated by using a map generated by a different camera.

<Modification>

In the above description, the transformation information is a remapping table. However, the present disclosure is not limited to this, and the transformation information suffices to be information that can transform an element to be used for map collation into a geometric space expressed according to a common parameter. For example, the inverse transformation of equation (6) can be used to directly transform the detected feature point coordinates into two-dimensional coordinates of a two-dimensional geometric space expressed according to a common parameter. Since such an arrangement does not require interpolation of the remapping table, transformation into two-dimensional coordinates can be performed accurately.

In addition, transformation using the transformation information can be performed by including not only the detected feature point but also the surrounding local region (for example, the surrounding 15 pixels (to be referred to as a local patch hereinafter)). A feature amount calculated by using the transformed local patch can be used to perform feature point matching with a map. Since such an arrangement will allow a patch for calculating a feature amount to be shared between cameras (that is, be expressed by a common parameter), feature point matching will be able to be performed more accurately.

Fifth Embodiment

The fifth embodiment will describe a mode which allows map information that has been generated without using a common parameter to be used in a camera different from a camera used for generating the map information. More specifically, the map information is transformed so that it will become usable in a manner similar to map information that has been generated based on a common parameter as described in the first to fourth embodiments.

<Apparatus Arrangement>

Figure 8:
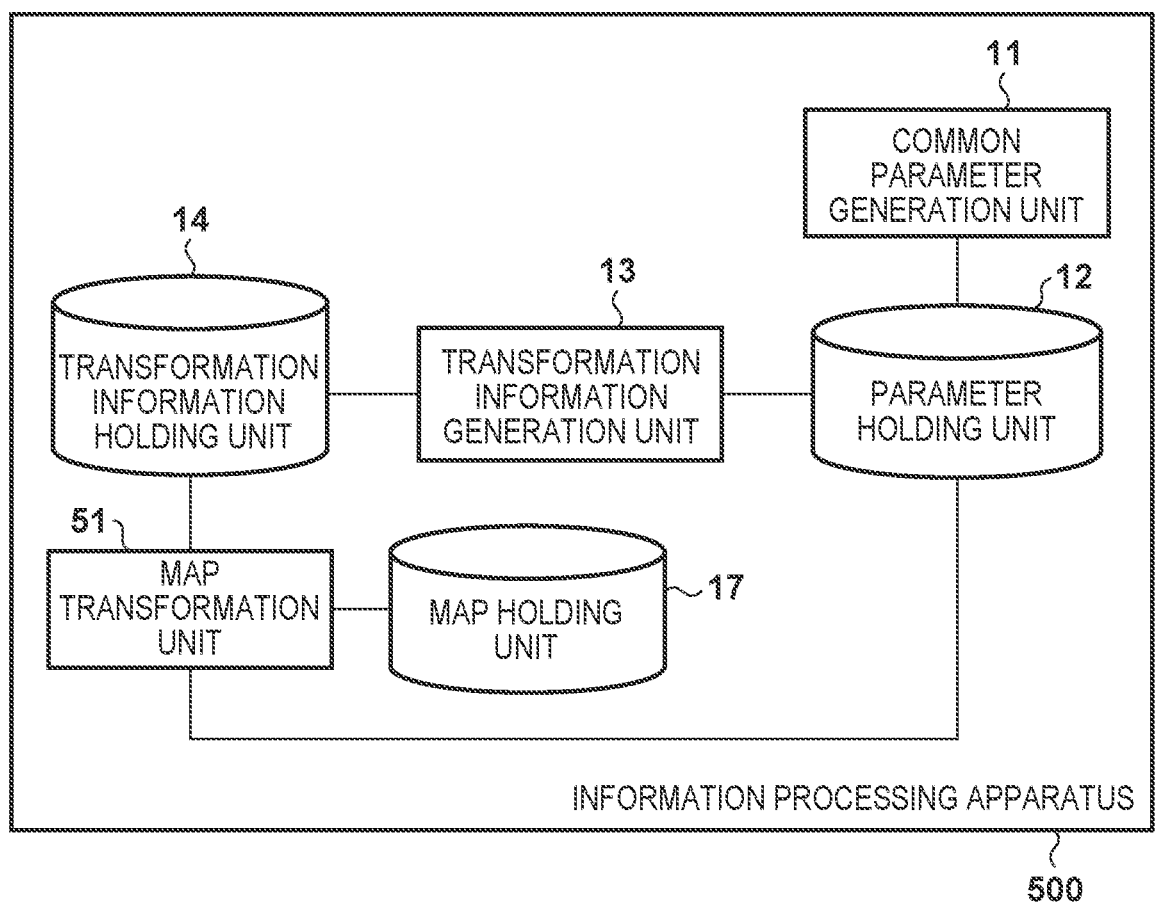
FIG. 8 is a block diagram showing the functional arrangement of an information processing apparatus (fifth embodiment)

FIG. 8 is a block diagram showing the functional arrangement of an information processing apparatus 500 according to the fifth embodiment. The information processing apparatus 500 includes a map transformation unit 51, a common parameter generation unit 11, a parameter holding unit 12, a transformation information generation unit 13, a transformation information holding unit 14, and a map holding unit 17. Components denoted by the same reference numerals as the components of an information processing apparatus 100 have substantially similar functions as the components of the information processing apparatus 100. However, the arrangement of the fifth embodiment is different in the point that the transformation information holding unit 14 outputs transformation information to the map transformation unit 51 and in the point that the map transformation unit 51 uses the transformation information to perform map information transformation.

<Operation of Apparatus>

Figure 9:
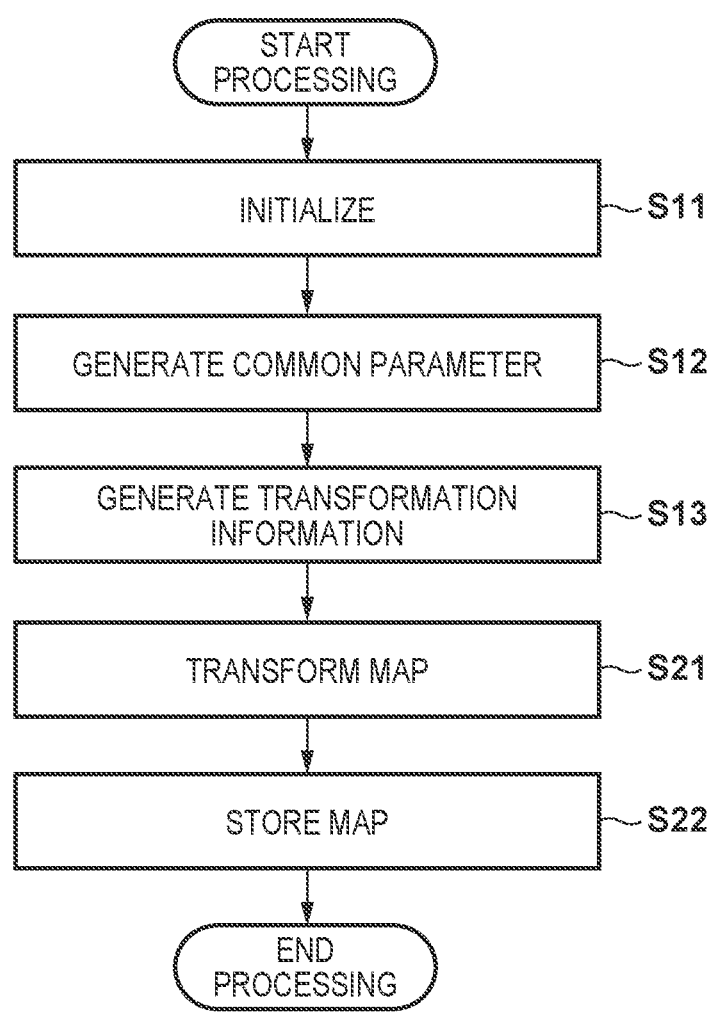
FIG. 9 is a flowchart for explaining an operation of the information processing apparatus (fifth embodiment).

FIG. 9 is a flowchart for explaining the operation of the information processing apparatus 500 according to the fifth embodiment. Since the processes of step S11 and step S12 are similar to those of the first embodiment, a description will be omitted. In step S13, the transformation information generation unit 13 generates transformation information (remapping table). A remapping table that can transform image coordinates expressed by a distortion corrected camera parameter of a camera 2 that generated the map into transformed image coordinates expressed according to a common parameter will be generated here.

In step S21, the map transformation unit 51 generates transformed map information by using the transformation information to transform the map information into a format expressed according to the common parameter. More specifically, the two-dimensional coordinates of a feature point of the map information (map information expressed according to the distortion corrected camera parameter of the camera 2) are transformed, by referring to the remapping table, into two-dimensional coordinates that can be detected in a transformed image expressed according to the common parameter. Interpolation described in the fourth embodiment can be used here to calculate two-dimensional coordinates.

In step S22, the map transformation unit 51 stores, in the map holding unit 17, the transformed map information obtained by the transformation operation.

<Effect>

As described above, according to the fifth embodiment, the two-dimensional coordinates of a feature point included in the map information which has been generated without using a common parameter will be transformed into transformed image coordinates which are expressed according to the common parameter. Such an arrangement will allow map information that has been generated without using a common parameter to be used by other cameras. That is, the labor needed for regenerating a map for each camera and the labor needed for map regeneration when a common parameter is to be changed can be decreased in a manner similar to the first to fourth embodiments.

<Modification>

In the above description, the two-dimensional coordinates of a feature point included in the map information are transformed into two-dimensional coordinates that can be detected in a transformed image which is expressed according to a common parameter. However, in a case in which pieces of information linked to an image and a camera parameter such as a patch around a feature point are held, the image and the patch around the feature point may be transformed together as well. Such an arrangement will improve the accuracy of feature point matching between a map and an input image and the accuracy of position and orientation measurement.

In addition, it may be arranged so not only one piece of map information will be transformed to be expressed according to a common parameter, but a plurality of pieces of map information will be transformed to be expressed according to the common parameter and be composited. The plurality of pieces of map information can be pieces of map information which were generated based on different camera parameters. Map compositing is an operation performed to align two maps and composite the two maps into a single piece of map information. In map compositing, feature points included in the respective maps are matched, and the coordinates of the remaining map elements are transformed so that the matched feature points will have identical coordinates. By setting such an arrangement, a vast region (three-dimensional space) can be composited by sharing the vast region among a plurality of cameras and causing the plurality of cameras to perform image capturing/generation in parallel. As a result, the map generation time can be reduced. In addition, the size of the map can be reduced by using Raul's method to remove redundant feature points similarly observed from a plurality of viewpoints.

In addition, although an arrangement in which the embodiment is implemented in a single apparatus has been described above, the embodiment may also be arranged as a server-client system. For example, it can be arranged so that map collation will be implemented by a server and map generation will be implemented by a plurality of clients such as a plurality of mobile robots. Each client will generate/update an individual local map and transmit the generated/updated individual local map to the server. The server will use the above-described method to composite the received individual maps and update a global map. The server will also transmit a part of the global map to each client, and the client will update its position and orientation and its map by using the received local map.

Furthermore, instead of transforming the map information into map information expressed according to a common parameter and storing the transformed map information, it may be arranged so that the transformed map information will be directly used for map collation. That is, when a map collation unit 18 is to use a map, only elements to be referred from the map information may be transformed and used. That is, in map information transformation, all of the pieces of map information may be transformed or only the pieces of information to be used for collation may be selectively transformed. In addition, the map holding unit 17 may be arranged to hold a plurality of pieces of map information that have been generated without using a common parameter. In such a case, when each map is to be used by the map collation unit 18, each map will be used by transforming the map to be expressed according to a common parameter as needed.

Summary of Effects of First to Fifth Embodiments

According to the first embodiment, map collation is performed after transforming, in advance, the image of the camera 1 into a transformed image which is expressed according to a common parameter. At this time, the distortion corrected camera parameter of the camera 2 used to generate the map is used as the common parameter. By executing processing in this manner, collation of the map and the image and the position and orientation calculation can be performed stably and accurately even in a case in which the camera used to generate the map is different from the camera used in the position and orientation calculation. In addition, the labor needed for generating a map for each camera will be eliminated. Furthermore, the transformation of the image of the camera 1 into an image expressed according to the common parameter can be implemented by just changing the remapping table used in the image correction processing (remapping) of a conventional distortion correction operation. Therefore, image transformation can be implemented without increasing the processing time of the map collation processing.

According to the second embodiment, the user can set a common parameter by viewing the transformed image. For example, the user will be able to set a common parameter that will allow a region captured in the input image of the camera 1 to be used at a maximum size or a common parameter that can process a wide angle range, and the user will be able to set a common parameter corresponding to the purpose.

According to the third embodiment, a common parameter that allows a maximum amount of pixels of each camera to be used can be generated. As a result, it will be possible to stably and accurately calculate the position and the orientation of a camera even in a case in which a map generated by another camera is used.

According to the fourth embodiment, instead of transforming an image, the two-dimensional coordinates of a feature point detected from the image are transformed into two-dimensional coordinates detected in a transformed image expressed according to a common parameter. Such an arrangement can reduce the memory used to hold a transformed image while allowing the position and the orientation of a camera to be calculated by using a map generated by a different camera.

According to the fifth embodiment, the two-dimensional coordinates of a feature point included in the map information which has been generated without using a common parameter will be transformed into transformed image coordinates which are expressed according to the common parameter. Such an arrangement will allow map information that has been generated without using a common parameter to be used by other cameras. That is, the labor needed for regenerating a map for each camera and the labor needed for map regeneration when a common parameter is to be changed can be decreased in a manner similar to the first to fourth embodiments.

Summary of Components of First to Fifth Embodiments

The common parameter generation unit generates a common parameter that will create the same correspondence relationship when a three-dimensional space is projected to a two-dimensional array. In a case in which a camera is used as a sensor and a pinhole camera model is used as the camera model, the common parameter $\hat{c}$ is represented by the focal length $(\hat{f_x}, \hat{f_y})$ and the image center coordinates $(\hat{c_x}, \hat{c_y})$.

A common parameter suffices to be a parameter that can set the same three-dimensional/two-dimensional correspondence relationship even when another camera is used. Hence, a distortion corrected camera parameter of a camera that generated a map may be used as a common parameter or a common parameter may be generated from a value input by the user. Furthermore, a parameter that can improve the map collation accuracy may be generated from a plurality of camera parameters.

The parameter holding unit holds the parameter generated by the common parameter generation unit. The parameter is output to the transformation information generation unit and the map collation unit as needed.

The transformation information generation unit uses the common parameter to generate transformation information used to transform an input image into a transformed image expressed according to the common parameter. The transformation information suffices to be information that allows the correspondence relationship between the input image and the transformed image expressed according to the common parameter to be understood, and the transformation formula (for example, equation (6)) and the type of the remapping table to be used are not particularly limited.

The transformation information holding unit holds the transformation information generated by the transformation information generation unit. In addition, the transformation information holding unit outputs the transformation information to the transformation unit as needed.

The input unit inputs sensor information obtained by the sensor and outputs the obtained information to the transformation unit. The sensor suffices to be a sensor that can capture a three-dimensional space and store the captured three-dimensional space in a two-dimensional array. An arbitrary camera such as a monochrome camera, a color camera, a stereo camera, a depth camera, or the like can be used as the sensor. In addition, the sensor may be a three-dimensional LiDAR arranged to project a three-dimensional space onto a two-dimensional array and storing the projected space in the two-dimensional array. The sensor may be arranged to include a single lens camera, a stereo camera, or a plurality of cameras.

The transformation unit suffices to be a unit that transforms the sensor information input by the input unit into information expressed according to the common parameter. In a case in which an image is to be used as the sensor information, the image can be transformed by referring to a remapping table. In addition, the two-dimensional coordinates of a feature point detected from the image can be transformed into two-dimensional coordinates of a transformed image expressed according to the common parameter.

The map holding unit holds the sensor information input by the input unit and map information generated by another sensor. The map information includes a feature which has three-dimensional position information and a feature which is expressed as two-dimensional position information. In a case in which an image is to be used as the sensor information, the map information will hold image feature information detected from the image, position and orientation information of a camera that captured the image from which the image feature was detected, and three-dimensional position information of the image feature. However, the data structure of the map information is not limited to this, and suffices to be arranged to hold a feature which has coordinates that represent a three-dimensional spatial position and a feature representing a two-dimensional spatial position obtained by projecting the feature of the three-dimensional spatial position to a two-dimensional space. A feature which represents the three-dimensional spatial position need not only be a feature that holds a single three-dimensional coordinate point such as a feature point, but also may be an NP (Normal Point Data) that includes a normal. A feature may also be an SDF (Signed Distance Function) or an TSDF (Truncated Signed Function) that represents a boundary position of an object in a space. A feature may also be a three-dimensional line segment. In addition, a feature representing a two-dimensional spatial position is not limited to the feature point described in this embodiment, and may be an edge or distribution information of bright regions and dark regions.

The map collation unit collates the sensor information transformed by the transformation unit and the map information. The collation processing may be performed by executing position and orientation calculation or feature matching with a map. The SLAM technique may be used in the position and orientation calculation. In addition, the map collation unit need not be limited to map collation and may be arranged as a map transformation unit that transforms the map information so that it will be expressed in accordance with the common parameter. Furthermore, the map collation unit may also be formed as a map compositing unit that composites a plurality of maps to generate a map expressed according to the common parameter.

OTHER EXAMPLES

The first to fifth embodiments described a method in which common map information is used between two cameras, that is, the camera 2 which generates the map information and the camera 1 which uses the map information to calculate the position and the orientation. However, the number of cameras to use the map information is not limited to two, and the map information may be used by many more cameras. In addition, a common parameter can be generated by using a parameter appropriate to these plurality of cameras.

For example, in the first embodiment, one of the distortion corrected camera parameters of the plurality of cameras can be selected and used as the common parameter. The common region among the images of the plurality of cameras may also be presented in the display component 241 of the GUI 200 described in the second embodiment. The displayed image 250 may also present the transformed image of each camera. In such a case, the user will determine the common parameter based on the images of the plurality of cameras. Furthermore, in the third embodiment, in the process of step S311 of FIG. 4, whether the transformed image is included in an image region can be sequentially determined for the third camera and subsequent cameras, and the common parameter can be generated based on this determination.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-113194, filed Jun. 30, 2020 which is hereby incorporated by reference herein in its entirety.

What is claimed is:

1. An information processing apparatus comprising:
an image obtainment unit configured to obtain a first image which is obtained by using a first camera to capture a three-dimensional space;
a map information obtainment unit configured to obtain map information that is generated based on a second transformed image obtained by using second transformation information to geometrically transform a second image which has been captured by using a second camera different from the first camera to capture the three-dimensional space;
an image transformation unit configured to generate a first transformed image by using first transformation information to geometrically transform the first image; and
a collation unit configured to collate the map information and the first transformed image,
wherein the first transformation information and the second transformation information are set so that a geometric correspondence relationship between the three-dimensional space and the first transformed image and a geometric correspondence relationship between the three-dimensional space and the second transformed image will have a common geometric correspondence relationship.

2. The apparatus according to claim 1, wherein the first transformation information includes a camera parameter of the first camera, and the second transformation information includes a camera parameter of the second camera.

3. The apparatus according to claim 1, wherein the second transformation information is transformation information that performs at least one of angle of view adjustment, image center adjustment, and distortion correction on the image captured by the second camera.

4. The apparatus according to claim 1, further comprising:
a transformation information generation unit configured to generate the first transformation information based on the common geometric correspondence relationship and a camera parameter of the first camera.

5. The apparatus according to claim 1, wherein each of the first image and the second image includes a depth map.

6. The apparatus according to claim 1, further comprising:
a parameter generation unit configured to generate a common parameter that indicates the common geometric correspondence relationship.

7. The apparatus according to claim 6, wherein the parameter generation unit selects one of a camera parameter of the second camera and a camera parameter of an image obtained by correcting a distortion of the image captured by the second camera.

8. The apparatus according to claim 6, wherein the parameter generation unit generates the common parameter based on at least one of the range of an image capturing region of the first camera included in the first transformed image and a degree representing the image quality level of a transformed image.

9. The apparatus according to claim 6, wherein the parameter generation unit generates the common parameter based on a camera parameter designated by a user.

10. The apparatus according to claim 6, wherein the parameter generation unit generates the common parameter based on an image capturing range of the first camera and an image capturing range of the second camera.

11. The apparatus according to claim 10, wherein the parameter generation unit generates the common parameter so that both the image capturing range of the first camera and the image capturing range of the second camera are included in the range of the first transformed image.

12. The apparatus according to claim 1, further comprising:
a map information updating unit configured to update the map information based on the first transformed image.

13. The apparatus according to claim 1, further comprising:
a second map information obtainment unit configured to obtain second map information generated based on a third transformed image which is obtained by using third transformation information to geometrically transform a third image obtained by using a third camera to capture the three-dimensional space; and
a map information transformation unit configured to generate transformed map information obtained by transforming the second map information so that the second map information will have a common geometric correspondence relationship with the map information.

14. The apparatus according to claim 13, further comprising:
a compositing unit configured to composite the map information and the transformed map information into a single piece of map information.

15. The apparatus according to claim 1, wherein the collation unit calculates a position and an orientation of the first camera by the collation.

16. An information processing apparatus comprising:
an image obtainment unit configured to obtain a first image which is obtained by using a first camera to capture a three-dimensional space;
a map information obtainment unit configured to obtain map information that is generated based on a second transformed image obtained by using second transformation information to geometrically transform a second image which has been captured by using a second camera which is different from the first camera to capture the three-dimensional space; and
a collation unit configured to collate a feature point of the first image and the map information of transformed coordinates which are obtained by using first transformation information to geometrically transform the coordinates of the feature point of the first image,
wherein the first transformation information and the second transformation information are set so that a geometric correspondence relationship between the three-dimensional space and a first transformed image, which is obtained by using the first transform information to transform the first image, and a geometric correspondence relationship between the three-dimensional space and the second transformed image will have a common geometric correspondence relationship.

17. An information processing method comprising:
obtaining a first image which is obtained by using a first camera to capture a three-dimensional space;
obtaining map information that is generated based on a second transformed image obtained by using second transformation information to geometrically transform a second image which has been captured by using a second camera different from the first camera to capture the three-dimensional space;
generating a first transformed image by using first transformation information to geometrically transform the first image; and
collating the map information and the first transformed image,
wherein the first transformation information and the second transformation information are set so that a geometric correspondence relationship between the three-dimensional space and the first transformed image and a geometric correspondence relationship between the three-dimensional space and the second transformed image will have a common geometric correspondence relationship.

18. An information processing method comprising:
obtaining a first image which is obtained by using a first camera to capture a three-dimensional space;
obtaining map information that is generated based on a second transformed image obtained by using second transformation information to geometrically transform a second image which has been captured by using a second camera which is different from the first camera to capture the three-dimensional space; and
collating a feature point of the first image and the map information of transformed coordinates which are obtained by using first transformation information to geometrically transform the coordinates of the feature point of the first image,
wherein the first transformation information and the second transformation information are set so that a geometric correspondence relationship between the three-dimensional space and a first transformed image, which is obtained by using the first transform information to transform the first image, and a geometric correspondence relationship between the three-dimensional space and the second transformed image will have a common geometric correspondence relationship.

19. A non-transitory computer-readable recording medium storing a program for causing a computer to function as an information processing apparatus comprising:
an image obtainment unit configured to obtain a first image which is obtained by using a first camera to capture a three-dimensional space;
a map information obtainment unit configured to obtain map information that is generated based on a second transformed image obtained by using second transformation information to geometrically transform a second image which has been captured by using a second camera different from the first camera to capture the three-dimensional space;
an image transformation unit configured to generate a first transformed image by using first transformation information to geometrically transform the first image; and
a collation unit configured to collate the map information and the first transformed image,
wherein the first transformation information and the second transformation information are set so that a geometric correspondence relationship between the three-dimensional space and the first transformed image and a geometric correspondence relationship between the three-dimensional space and the second transformed image will have a common geometric correspondence relationship.

20. A non-transitory computer-readable recording medium storing a program for causing a computer to function as an information processing apparatus comprising:

an image obtainment unit configured to obtain a first image which is obtained by using a first camera to capture a three-dimensional space;

a map information obtainment unit configured to obtain map information that is generated based on a second transformed image obtained by using second transformation information to geometrically transform a second image which has been captured by using a second camera which is different from the first camera to capture the three-dimensional space; and a collation unit configured to collate a feature point of the first image and the map information of transformed coordinates which are obtained by using first transformation information to geometrically transform the coordinates of the feature point of the first image, wherein the first transformation information and the second transformation information are set so that a geometric correspondence relationship between the three-dimensional space and a first transformed image, which is obtained by using the first transform information to transform the first image, and a geometric correspondence relationship between the three-dimensional space and the second transformed image will have a common geometric correspondence relationship.

* * * * *